(12) United States Patent
Kim et al.

(10) Patent No.: US 11,883,781 B2
(45) Date of Patent: Jan. 30, 2024

(54) APPARATUS AND METHOD FOR REMOVING NITROGEN OXIDE FROM EXHAUST GAS

(71) Applicant: KOREA INSTITUTE OF MACHINERY & MATERIALS, Daejeon (KR)

(72) Inventors: Hak Joon Kim, Daejeon (KR); Yong-Jin Kim, Daejeon (KR); Bangwoo Han, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 17/904,387

(22) PCT Filed: Feb. 19, 2021

(86) PCT No.: PCT/KR2021/002101
§ 371 (c)(1),
(2) Date: Aug. 17, 2022

(87) PCT Pub. No.: WO2021/167388
PCT Pub. Date: Aug. 26, 2021

(65) Prior Publication Data
US 2023/0087167 A1    Mar. 23, 2023

(30) Foreign Application Priority Data

Feb. 19, 2020 (KR) .................. 10-2020-0020248
Feb. 19, 2020 (KR) .................. 10-2020-0020263

(51) Int. Cl.
| | | |
|---|---|---|
| *B01D 53/30* | (2006.01) | |
| *B01D 53/34* | (2006.01) | |
| *B01D 53/56* | (2006.01) | |
| *B01D 53/75* | (2006.01) | |
| *B01D 53/76* | (2006.01) | |
| *B01D 53/79* | (2006.01) | |
| *B03C 3/017* | (2006.01) | |
| *B03C 3/16* | (2006.01) | |

(52) U.S. Cl.
CPC ............. *B01D 53/79* (2013.01); *B01D 53/30* (2013.01); *B01D 53/346* (2013.01); *B01D 53/56* (2013.01); *B01D 53/75* (2013.01); *B01D 53/76* (2013.01); *B03C 3/017* (2013.01); *B03C 3/16* (2013.01); *B01D 2251/104* (2013.01); *B01D 2251/304* (2013.01); *B01D 2251/608* (2013.01)

(58) Field of Classification Search
CPC ...... B01D 53/79; B01D 53/30; B01D 53/346; B01D 53/56; B01D 53/75; B01D 53/76; B01D 2251/104; B01D 2251/304; B01D 2251/608; B01D 2257/404; B01D 2258/0283; B03C 3/017; B03C 3/16
See application file for complete search history.

(56) References Cited

U.S. PATENT DOCUMENTS

| | | | | |
|---|---|---|---|---|
| 2003/0108472 A1* | 6/2003 | Duncan | .................. | B01D 53/60 422/186.04 |
| 2004/0105802 A1* | 6/2004 | Duncan | .................. | B01D 53/73 423/235 |

FOREIGN PATENT DOCUMENTS

| | | | | |
|---|---|---|---|---|
| CN | 108 176 208 A | * | 6/2018 | ............. B01D 53/75 |
| JP | 2001-062421 | | 3/2001 | |
| JP | 5276460 | | 8/2013 | |
| KR | 10-0268029 | | 10/2000 | |
| KR | 10-0702660 | | 4/2007 | |
| KR | 10-1173496 | | 8/2012 | |
| KR | 10-1696979 | | 1/2017 | |
| KR | 10-1815085 | | 1/2018 | |
| KR | 10-1967985 | | 4/2019 | |

* cited by examiner

*Primary Examiner* — Timothy C Vanoy
(74) *Attorney, Agent, or Firm* — LEX IP MEISTER, PLLC (57) ABSTRACT

An exemplary embodiment of the present invention relates to an apparatus and method for removing nitrogen oxide from exhaust gas. The apparatus for removing nitrogen oxide from exhaust gas includes: a chamber through which exhaust gas is introduced and discharged; a nozzle injecting a solution, which reacts with the exhaust gas introduced into the chamber, into the chamber; and an electric dust collecting unit installed at a rear end of the chamber to be supplied with the exhaust gas processed in the chamber and including a discharge unit and a dust collecting unit.

18 Claims, 5 Drawing Sheets

FIG. 5 ed States Patent
APPARATUS AND METHOD FOR REMOVING NITROGEN OXIDE FROM EXHAUST GAS

TECHNICAL FIELD

The present invention relates to an apparatus and method for removing nitrogen oxide from exhaust gas, and to an apparatus and method for removing nitrogen oxides from exhaust gas capable of significantly reducing the amount of reducing agent used while preventing a generation of hydrogen sulfide when removing the nitrogen oxide from the exhaust gas.

BACKGROUND ART

In general, gases used in semiconductor, LED, and LCD manufacturing processes are very diverse, and F-gas such as $NH_3$ or $NF_3$ has been used as a gas containing N component.

Various gas components used in manufacturing processes in the electronics industry are processed by a scrubber device (pyrolysis, combustion, plasma method), and thus, only harmless gases are finally discharged.

However, there are components that may be discharged without being completely processed by these methods. The pyrolysis method may not completely process NOx generated by the reaction of oxygen and N in the exhaust gas, the combustion method does not completely process NOx generated by the injection of oxidizing air is not completely processed, and the plasma method does not completely process NOx generated by the decomposition of $NH_3$ or $NF_3$.

In order to process such NOx, the NOx is processed by inputting a predetermined reducing agent acting as a denitrification agent and using a wet scrubber device or the like.

However, when using the existing wet scrubber device, the reducing agent is input to remove NOx, but there is a problem in that the generation of $H_2S$ according to the reducing agent rapidly increases.

DISCLOSURE

Technical Problem

The present invention has been made to provide an apparatus and method for removing nitrogen oxide from exhaust gas capable of preventing a generation of hydrogen sulfide upon removing the nitrogen oxide from the exhaust gas.

In addition, the present invention has been made to provide an apparatus and method for removing nitrogen oxide from exhaust gas capable of minimizing the amount of reducing agent used compared to a theoretical usage upon removing the nitrogen oxide from the exhaust gas.

Technical Solution

An exemplary embodiment of the present invention provides an apparatus for removing nitrogen oxide from exhaust gas, including: a chamber through which exhaust gas is introduced and discharged; a nozzle injecting a solution, which reacts with the exhaust gas introduced into the chamber, into the chamber; and an electric dust collecting unit installed at a rear end of the chamber to be supplied with the exhaust gas processed in the chamber and including a discharge unit and a dust collecting unit.

The apparatus may further include: a gas analyzer measuring a concentration of NOx and $H_2S$ of the exhaust gas discharged from the electric dust collecting unit; and a storage tank located under the chamber to store the solution, in which the solution may be circulated between the nozzle and the storage tank through a pump.

The solution may include the reducing agent that reacts with the NOx of the exhaust gas, and the apparatus may further include: a water tank having a reducing agent stored therein and supplying the reducing agent to the storage tank; a pH sensor measuring the pH of the reducing agent stored in the storage tank; an ORP sensor measuring an ORP of the reducing agent stored in the storage tank; and a control unit calculating an NOx removal rate based on the measured value of the ORP sensor according to the concentration of NOx of the gas analyzer, outputting the concentration of $H_2S$ based on the measured value of the pH sensor, and controlling input timing and an input amount of the reducing agent stored in the water tank according to a set standard value of the NOx removal rate or a set standard value of $H_2S$ generation concentration.

When the calculated NOx removal rate is smaller than the set NOx removal rate, the control unit may control to supply the reducing agent of the water tank to the first storage tank to be greater than or equal to the set NOx removal rate.

When the measured concentration of $H_2S$ becomes larger than the set concentration of $H_2S$, the control unit may control to supply the reducing agent of the water tank to the chamber to be less than or equal to the set concentration of $H_2S$.

The dust collecting unit may include a water film formed by the reducing agent.

The reducing agent may be sodium thiosulfate ($Na_2S_2O_3$) and sodium sulfite ($Na_2SO_3$) mixed in a one-to-one ratio.

The solution may include a reducing agent and a neutralizing agent, and the chamber may include: a first channel through which the reducing agent is injected into the chamber; and a second channel installed at a rear end of the first channel and through which the exhaust gas passing through the first channel is introduced and the neutralizing agent is injected into the chamber.

The chamber may be divided into the first channel and the second channel located on a side surface of the first channel by a partition wall, and the neutralizing agent may be sprayed so as not to be mixed with the reducing agent.

The apparatus may further include: a first storage tank located under the first channel and storing the reducing agent; a first water tank installed to supply the reducing agent to the first storage tank; an ORP sensor measuring an ORP of the reducing agent stored in the storage tank; a second storage tank located under the second channel and storing the neutralizing agent; a second water tank installed to supply the neutralizing agent to the second storage tank; a pH sensor measuring the pH of the neutralizing agent stored in the second storage tank; and a control unit calculating an NOx removal rate based on the measured value of the ORP sensor according to the concentration of NOx of the gas analyzer, outputting the concentration of $H_2S$ based on the measured value of the pH sensor, and controlling input timing and an input amount of the reducing agent and the neutralizing agent according to a set standard value of the NOx removal rate or a set standard value of $H_2S$ generation concentration.

The nozzle may include a first nozzle injecting the reducing agent into the first channel and a second nozzle injecting the neutralizing agent into the second channel, and the reducing agent may be circulated between the first nozzle and the first storage tank, and the neutralizing agent may be circulated between the second nozzle and the second storage tank.

When the calculated NOx removal rate is smaller than the set NOx removal rate, the control unit may control to supply the reducing agent of the water tank to the first channel to be greater than or equal to the set NOx removal rate.

When the measured concentration of $H_2S$ becomes larger than the set concentration of $H_2S$, the control unit may control to supply the neutralizing agent of the second water tank to the second channel to be less than or equal to the set concentration of $H_2S$.

The dust collecting unit may include a water film formed by the neutralizing agent.

The apparatus may further include: an ozone generator installed at a front end of the chamber to inject ozone into the exhaust gas before being injected into the chamber.

Another embodiment of the present invention provides a method of removing nitrogen oxide from exhaust gas, including: introducing the exhaust gas into a chamber; removing the nitrogen oxide by spraying a solution into the chamber; and collecting an acidic material particle in an electric dust collecting unit and removing the acidic material particle from the exhaust gas.

In the removing of the nitrogen oxide, a reducing agent made of sodium thiosulfate ($Na_2S_2O_3$) and sodium sulfite ($Na_2SO_3$) mixed in a one-to-one ratio may be sprayed into the chamber to react the reducing agent with the nitrogen dioxide contained in the exhaust gas, and the reducing agent may control input timing and an input amount according to the set reference value of NOx removal rate or a set reference value of $H_2S$ generation concentration.

The chamber may include a first channel and a second channel connected sequentially, and the removing of the nitrogen oxide may include: spraying a reducing agent into the exhaust gas introduced into the first channel; and spraying a neutralizing agent into the exhaust gas introduced into the second channel of the chamber through the first channel, and the reducing agent may control the input timing and input amount according to the set reference value of NOx removal rate, and the neutralizing agent may control the input timing and input amount according to the set reference value of $H_2S$ generation concentration.

The reducing agent may be anyone selected from a mixture of sodium thiosulfate ($Na_2S_2O_3$) and sodium sulfite ($Na_2SO_3$) mixed in a one-to-one ratio, or $Na_2S$, and the neutralizing agent may be NaOH.

The method may further include: injecting ozone by reacting nitrogen monoxide with ozone in the exhaust gas react to generate nitrogen dioxide before the exhaust gas is introduced into the chamber.

Advantageous Effects

According to an apparatus and method for removing nitrogen oxide from exhaust gas according to an embodiment of the present invention, it is possible to prevent the generation of hydrogen sulfide upon removing the nitrogen oxide from the exhaust gas.

In addition, according to an apparatus and method for removing nitrogen oxide from exhaust gas, it is possible to minimize the amount of reducing agent used compared to a theoretical usage upon removing the nitrogen oxide from the exhaust gas.

MODE FOR INVENTION

Hereinafter, exemplary embodiments of the present invention will be described in detail with reference to the accompanying drawings so that those skilled in the art to which the present invention pertains may easily practice the present invention. However, the present invention may be implemented in various forms and is not limited to exemplary embodiments provided herein.

Portions unrelated to the description will be omitted to obviously describe the present invention, and similar components will be denoted by the same or similar reference numerals throughout the present specification.

Throughout the present specification, when any one part is referred to as being "connected (joined, contacted, and coupled) to" another part, it means that any one part and another part are "directly connected to" each other or are "indirectly connected to" each other with the other part interposed therebetween. In addition, "including" or "having" any components will be understood to imply the inclusion of other components rather than the exclusion of other components, unless explicitly described to the contrary.

Prior to describing the present invention, in several exemplary embodiments, components having the same configuration will be representatively described using the same reference numeral in a first exemplary embodiment, and components different from those of a first exemplary embodiment will be described in the other exemplary embodiments.

Hereinafter, an apparatus for removing nitrogen oxide from exhaust gas according to a first exemplary embodiment of the present invention will be described in detail with reference to the accompanying drawings.

Figure 1:
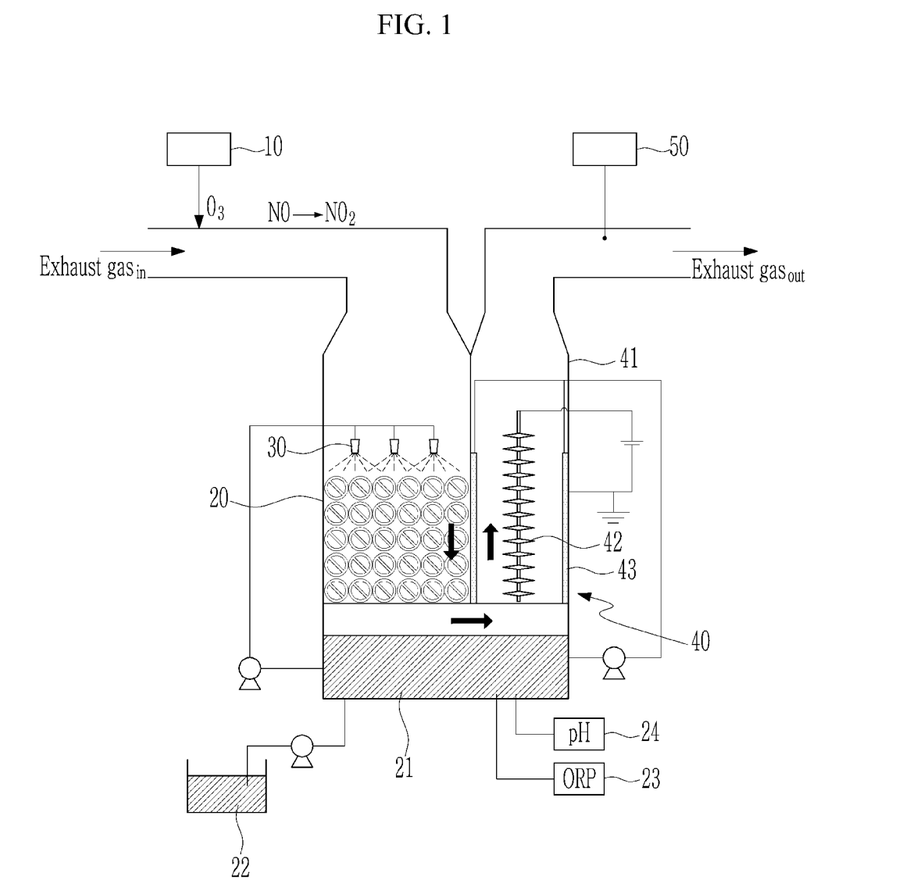
FIG. 1 is a schematic diagram of an apparatus for removing nitrogen oxide from exhaust gas according to a first exemplary embodiment of the present invention.

FIG. 1 is a schematic diagram of an apparatus for removing nitrogen oxide from exhaust gas according to a first exemplary embodiment of the present invention. Referring to FIG. 1, the apparatus for removing nitrogen oxide from exhaust gas according to the first exemplary embodiment of the present invention is configured to include an ozone generator 10, a chamber 20, a nozzle 30, an electric dust collecting unit 40, a gas analyzer 50, and a control unit (not illustrated).

The ozone generator 10 generates ozone ($O_3$) using a dielectric barrier discharge or the like, and the generated ozone ($O_3$) is injected into the exhaust gas. By the injected ozone ($O_3$), NO, which is a main component of NOx contained in the exhaust gas, is oxidized to $NO_2$ as shown in the following Chemical Formula.

(Chemical Formula 1)

The chamber 20 is in the form of a box formed long in a longitudinal direction, and has an inlet provided at an upper end thereof to introduce exhaust gas containing nitrogen dioxide, and an outlet provided on a lower side surface thereof to discharge the introduced exhaust gas.

The outlet may be installed to communicate with an electric dust collecting unit 40, which is a wet electric dust collecting unit leading to the next process.

In addition, a storage tank 21 is provided under the outlet, and the storage tank 21 is installed to be supplied with a solution from a separately provided water tank 22. In this case, the solution may contain a reducing agent.

For example, the reducing agent is stored in the water tank 22, and the reducing agent may be sodium thiosulfate ($Na_2S_2O_3$) and sodium sulfite ($Na_2SO_3$) mixed in a one-to-one ratio.

The storage tank 21 is provided with an oxidation-reduction potential (ORP) sensor 23 that measures oxidation-reduction potential (OPR) of the reducing agent, a pH sensor 24 that measures pH, and the like. The ORP sensor 23 is a device that senses a redox potential, and the pH sensor 24 is a device that measures a concentration of $H_2S$. In addition, the measured values of the ORP sensor 23 and the pH sensor 24 are installed to be transmitted to the control unit.

The nozzle 30 is installed to spray the reducing agent provided by being located on an upper side inside the chamber 20. The reducing agent is circulated between the nozzle 30 and the storage tank 21 through the pump, and the amount of reducing agent is gradually reduced through the reaction with the exhaust gas, so a certain amount of reducing agent is periodically supplied by the control unit to be described later through the water tank 22.

The gas analyzer 50 measures the concentration of NOx and $H_2S$ of the exhaust gas that has passed through the electric dust collecting unit 40 to be described later and is installed to transmit the measured values to the control unit.

The control unit (not illustrated) is provided to calculate an NOx removal rate by receiving the concentration of NOx, the concentration of $H_2S$ provided from the gas analyzer 50 and each measured value provided from the pH sensor 24 and the ORP sensor 23 may be received, and may control the input timing and input amount of the reducing agent stored in the water tank 22 according to the preset reference value of NOx removal rate or the preset reference value of $H_2S$ generation concentration.

For example, when the calculated NOx removal rate is smaller than the set NOx removal rate, the control unit controls to supply the reducing agent of the water tank 22 to the chamber 20 to be greater than or equal to the set NOx removal rate.

In addition, when the measured concentration of $H_2S$ becomes larger than the set concentration of $H_2S$, the control unit may control to supply the reducing agent of the water tank 22 to the chamber 20 to be less than or equal to the set concentration of $H_2S$.

Meanwhile, the control unit calculates the NOx removal rate through the measured value of the ORP sensor 23 and is provided to measure the concentration of $H_2S$ through the measured value of the pH sensor 24.

The electric dust collecting unit 40 is configured to include a dust collecting unit chamber 41 that is provided to be supplied with, from the chamber 20, the exhaust gas from which NOx has been removed and discharge the exhaust gas, a discharge unit 42 that discharges particles by high voltage discharge, and a dust collecting unit 43 that collects the discharged particles.

Here, the dust collecting unit 43 is provided in a water film type that forms a water film inside a wall of the dust collecting unit chamber 41 by the reducing agent circulated by a pump. A specific configuration of the water film type dust collecting unit may be provided in the form disclosed in Korean Patent No. 10-1173496 or Korean Patent No. 1967985 registered by the present applicant.

The dust collecting unit 43 includes the water film formed by the reducing agent, and therefore, collects and processes acidic materials among the exhaust gas particles introduced thereinto.

Hereinafter, a method of removing nitrogen oxide from exhaust gas using the apparatus for removing nitrogen oxide from exhaust gas according to the above-described first exemplary embodiment will be described.

Figure 2:
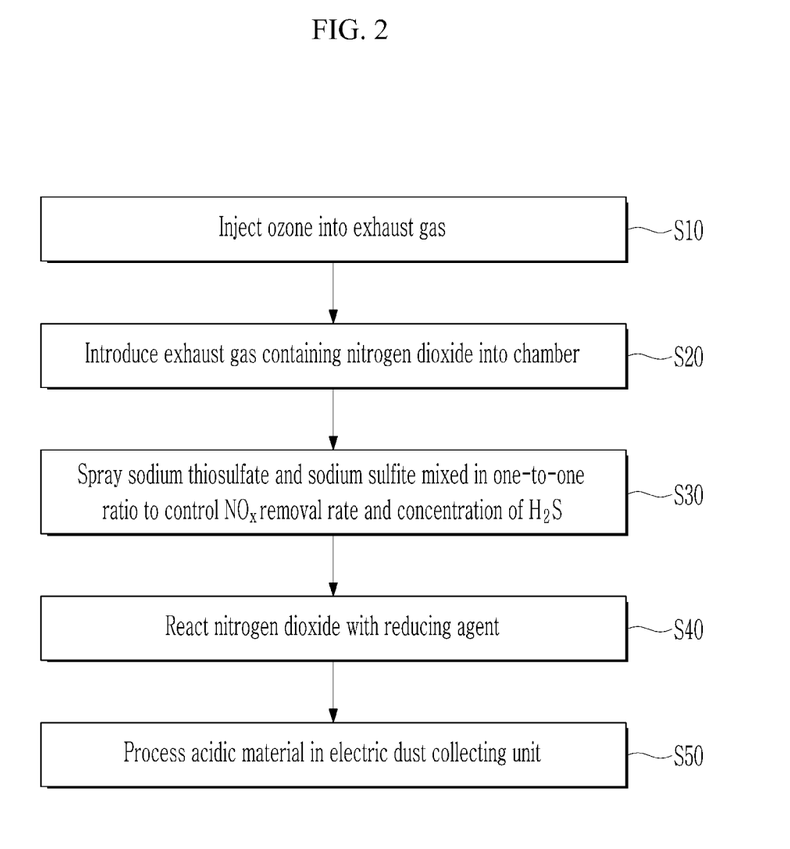
FIG. 2 is a flowchart of a method of removing nitrogen oxide from exhaust gas using the apparatus of FIG. 1.

FIG. 2 is a flowchart of a method of removing nitrogen oxide from exhaust gas using the apparatus of FIG. 1. Referring to FIG. 2, in the method of removing nitrogen oxides from exhaust gas according to the present invention, first, ozone generated from the ozone generator 10 is introduced into the exhaust gas before the exhaust gas discharged from a process such as a semiconductor is introduced into the chamber 20 (S10).

The injected ozone reacts with nitrogen monoxide contained in the exhaust gas as shown in the above (Chemical Formula 1) to generate nitrogen dioxide.

Then, the exhaust gas containing the nitrogen dioxide is introduced into the chamber (S20), and when sodium thiosulfate ($Na_2S_2O_3$) and sodium sulfite ($Na_2SO_3$) mixed in a one-to-one ratio in the nozzle 30 inside the chamber are sprayed into the chamber (S30), the sprayed sodium thiosulfate ($Na_2S_2O_3$) and sodium sulfite ($Na_2SO_3$) react with the nitrogen dioxide in the exhaust gas, respectively, according to the Chemical Formula below (S40).

$2NO_2+4Na_2SO_3 \rightarrow 4Na_2SO_4+N_2$ (Chemical Formula 2)

$2NO_2+Na_2S_2O_3+H_2O \rightarrow Na_2S_2O_4+2HNO_2+S$ (Chemical Formula 3)

In this case, the control unit may receive the concentration of NOx from the gas analyzer 50 and calculates the NOx removal rate and control the input timing and input amount of the reducing agent stored in the water tank 22 according to the preset reference value of NOx removal rate or the preset reference value of $H_2S$ generation concentration.

In this case, the NOx removal rate is calculated from the ORP measurement value received from the ORP sensor 23, and the $H_2S$ generation concentration may be measured from the pH measurement value received from the pH sensor 24.

The exhaust gas processed in the chamber 20 moves to the dust collecting unit chamber 41 of the electric dust collecting unit 40, and the acidic material is processed (S50). That is, the exhaust gas particles introduced into the dust collecting unit chamber 41 of the electric dust collecting unit 40 are discharged by the high voltage discharge of the discharge unit 41, and the acid material particles among the discharged particles are collected in the water film type dust collecting unit 42 formed by the reducing agent. Then, the exhaust gas that has passed through the electric dust collecting unit 40 is discharged to the outside.

When the nitrogen oxides are removed from the exhaust gas by the method as described above, the amount of reducing agent used may be minimized, and the hydrogen sulfide ($H_2S$) may not be generated.

Hereinafter, an apparatus for removing nitrogen oxide from exhaust gas according to another exemplary embodiment of the present invention will be described in detail with reference to the accompanying drawings.

Figure 3:
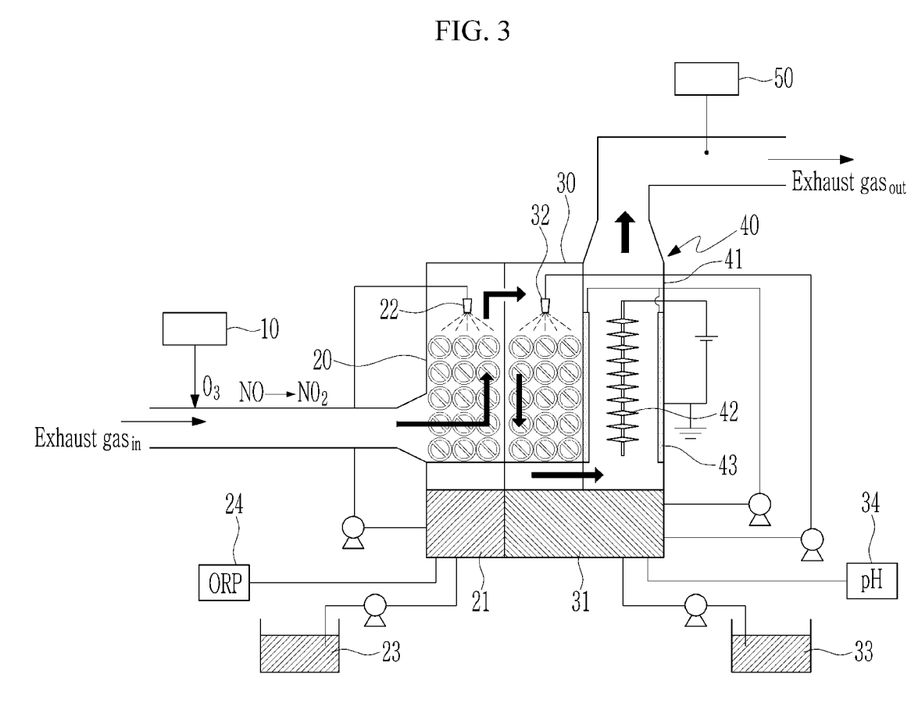
FIG. 3 is a schematic diagram of an apparatus for removing nitrogen oxide from exhaust gas according to a second exemplary embodiment of the present invention.

FIG. 3 is a schematic diagram of an apparatus for removing nitrogen oxide from exhaust gas according to a second exemplary embodiment of the present invention. Referring to FIG. 3, the apparatus for removing nitrogen oxide from exhaust gas according to the second exemplary embodiment of the present invention is configured to include an ozone generator 110, a chamber including a first channel 120 and a second channel 130, an electric dust collecting unit 140, a gas analyzer 150, and a control unit (not illustrated).

As in the above-described first exemplary embodiment, the ozone generator 110 generates ozone ($O_3$) by using a dielectric barrier discharge or the like, and the generated ozone ($O_3$) is injected into the exhaust gas introduced into the chamber. When the ozone ($O_3$) is injected into the exhaust gas, NO, which is a main component of NOx, is oxidized to $NO_2$.

That is, the exhaust gas is introduced into the chamber, including nitrogen dioxide ($NO_2$).

The chamber is configured to include the first channel 120 and the second channel 130. Each channel may be formed in a box shape long in one direction and may be disposed in a transverse direction to be sequentially connected to each other. For example, the second channel 130 may be connected to a rear end of the first channel 120, a chamber space may be divided into the first channel 120 and the second channel 130 by the partition wall, and the second channel 130 may be located on a side surface of the first channel 120. A first nozzle 122 and a second nozzle 132 may be installed on an inner upper side of each of the first channel 120 and the second channel 130.

The first channel 120 is provided with an inlet through which exhaust gas containing nitrogen dioxide is introduced from the side surface, and an upper side thereof is provided with an outlet through which exhaust gas is discharged through the second channel 130.

A communication port that communicates with the outlet of the first channel 120 may be provided above the second channel 130 and an outlet that communicates with the electric dust collecting unit 140 may be provided under the second channel 130.

The inlet, the outlet, and the communication port are not limited to the above-described shapes, and positions thereof may be changed according to the shape of the channel.

A first storage tank 121 in which the reducing agent is stored is provided under the first channel 120, and the first nozzle 122 is connected to spray the reducing agent stored in the first storage tank 121. As in the same structure in the second channel 130, a second storage tank 131 in which a neutralizing agent is stored is provided under the second channel 130, and a second nozzle 132 is connected to spray the neutralizing agent stored in the second storage tank 131.

The first storage tank 121 and the second storage tank 131 are connected to the first water tank 123 and the second water tank 133 separately provided and installed to be supplied with a solution. In this case, the solution may contain the reducing agent and the neutralizing agent.

For example, $Na_2S$, which is the reducing agent is stored in the first water tank 123, and NaOH, which is a neutralizing agent, is stored in the second water tank 133.

In addition, an ORP sensor 124 that measures oxidation-reduction potential (ORP) of the reducing agent is installed in the first storage tank 121, and a pH sensor 134 that measures the pH of the neutralizing agent is installed in the second storage tank 131.

The ORP sensor 124 is a device that senses a redox potential, and the pH sensor 134 is a device that measures a concentration of $H_2S$. In addition, the measured values of the ORP sensor 124 and the pH sensor 134 are installed to be transmitted to the control unit.

The first nozzle 122 and the second nozzle 132 are installed to spray the reducing agent and the neutralizing agent provided by being located on the upper side inside each channel. The reducing agent and the neutralizing agent are circulated between each nozzle and the storage tank through the pump, and the amount of reducing agent and neutralizing agent is gradually reduced through the reaction with the exhaust gas, so the certain amount of reducing agent and neutralizing agent is periodically supplied by the control unit to be described later through the water tank 22.

As in the first exemplary embodiment as described above, the gas analyzer 150 measures the concentration of NOx and $H_2S$ of the exhaust gas that has passed through the electric dust collecting unit 140 to be described later and is installed to transmit the measured values to the control unit.

The control unit (not illustrated) is provided to calculate an NOx removal rate by receiving the concentration of NOx, the concentration of $H_2S$ provided from the gas analyzer 50 and each measured value provided from the pH sensor 24 and the ORP sensor 23 may be received, and may control the input timing and amount of the reducing agent or the neutralizing agent stored in each water tank according to the preset reference value of NOx removal rate or the preset reference value of $H_2S$ generation concentration For example, when the calculated NOx removal rate is smaller than the set NOx removal rate, the control unit controls to supply the reducing agent of the first water tank 123 to the first chamber 120 to be greater than or equal to the set NOx removal rate.

In addition, when the measured concentration of $H_2S$ becomes larger than the set concentration of $H_2S$, the control unit may control to supply the neutralizing agent of the second water tank 133 to the second chamber 130 in order to be less than or equal to the set concentration of $H_2S$.

Meanwhile, the control unit calculates the NOx removal rate through the measured value of the ORP sensor 124 and is provided to measure the concentration of $H_2S$ through the measured value of the pH sensor 134.

The electric dust collecting unit 140 is configured to include a dust collecting unit chamber 141 that is provided to be supplied with, from the first channel 120, the exhaust gas from which NOx has been removed and discharge the exhaust gas, a discharge unit 142 that discharges particles by high voltage discharge, and a dust collecting unit 143 that collects the discharged particles.

Here, the dust collecting unit 143 is provided in a water film type that forms a water film inside a wall of the dust collecting unit chamber 141 by the neutralizing agent circulated by the pump.

The dust collecting unit 143 includes the water film formed by the neutralizing agent, and therefore, collects and processes acidic materials among the exhaust gas particles introduced thereinto.

Hereinafter, a method of removing nitrogen oxide from exhaust gas using the apparatus for removing nitrogen oxide from exhaust gas according to the above-described second exemplary embodiment will be described.

Figure 4:
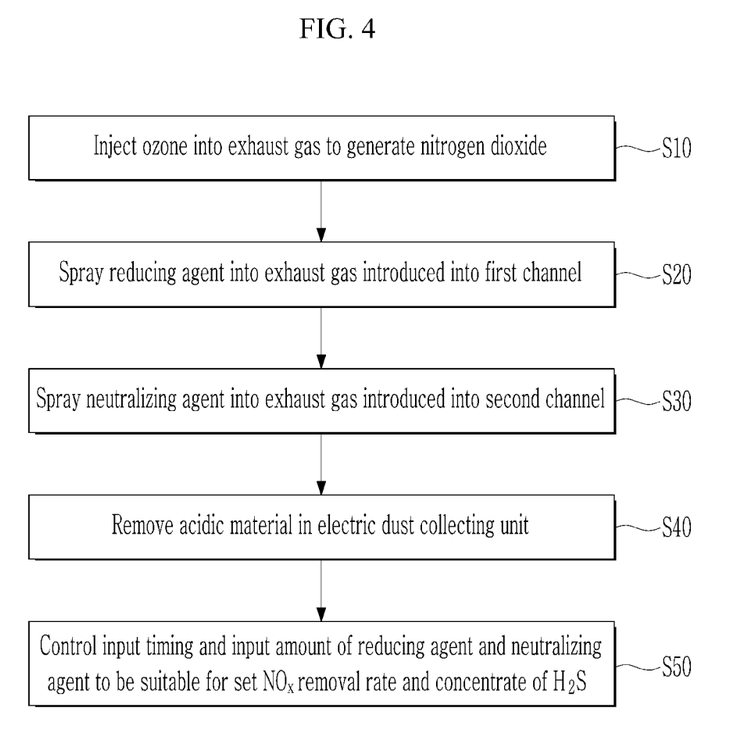
FIG. 4 is a flowchart of a method of removing nitrogen oxide from exhaust gas using the apparatus of FIG. 3.

FIG. 4 is a flowchart of a method of removing nitrogen oxide from exhaust gas using the apparatus of FIG. 3. Referring to FIG. 4, in the method of removing nitrogen oxides from exhaust gas according to the present invention, first, ozone generated from the ozone generator 110 is introduced into the exhaust gas before the exhaust gas discharged from a process such as a semiconductor is introduced into the first channel 120 (S10).

The injected ozone reacts with nitrogen monoxide contained in the exhaust gas as shown in the above (Chemical Formula 1) to generate nitrogen dioxide.

When the exhaust gas containing the nitrogen dioxide is introduced into the first channel 120, and $Na_2S$, which is the reducing agent, is sprayed from the first nozzle 122 installed in the first channel 120 (S120), the sprayed $Na_2S$ reacts with the nitrogen dioxide in the exhaust gas according to the following Chemical Formula.

$$2NO_2 + Na_2S \rightarrow N_2 + Na_2SO_4 \quad \text{(Chemical Formula 4)}$$

In this case, when most of $Na_2S$, which is the reducing agent, is consumed, $NO_2$ is not reduced to $N_2$ and nitric acid ($HNO_3$) is generated by the reaction below.

$$NO_2 + H_2O \rightarrow HNO_3 + NO \quad \text{(Chemical Formula 5)}$$

Here, the exhaust gas containing the nitrogen dioxide introduced into the first channel 120 reacts only with $Na_2S$, and the exhaust gas that has reacted with the $Na_2S$ is introduced into the second channel 130 in a state containing $HNO_3$.

In the second channel 130, NaOH, which is the neutralizing agent, is sprayed to the exhaust gas introduced from the first channel 120 through the second nozzle 132 (S130).

NaOH, which is the neutralizing agent, reacts with $HNO_3$ in the exhaust gas according to the following Chemical Formula to neutralize $HNO_3$.

$$HNO_3 + NaOH \rightarrow NaNO_3 + H_2O \quad \text{(Chemical Formula 6)}$$

By the above-described method, $NO_2$ is removed in the first channel to increase the NOx removal rate, and $HNO_3$ is removed in the second channel 130 to control pH.

Then, the exhaust gas discharged from the second channel 130 moves to the electric dust collecting unit 140 to process the acidic material (S140). Specifically, the exhaust gas particles introduced into the dust collecting unit chamber 41 of the electric dust collecting unit 140 are discharged by the high voltage discharge of the discharge unit 141, and the acid material particles among the discharged particles are collected in the water film type dust collecting unit 142 formed by the reducing agent.

Then, the exhaust gas from which the acidic material has been removed is discharged to the outside of the device. In this case, the concentration of NOx, the pH concentration, and the like of the exhaust gas discharged through the gas analyzer 150 are measured.

Meanwhile, the control unit may receive the concentration of NOx from the gas analyzer 150 and calculates the NOx removal rate and control the input timing and input amount of the reducing agent and the neutralizing agent according to the preset reference value of NOx removal rate or the preset reference value of $H_2S$ generation concentration.

In this case, the NOx removal rate is calculated from the ORP measurement value received from the ORP sensor 124, and the $H_2S$ generation concentration may be measured from the pH measurement value received from the pH sensor 134.

By using the method, it is possible to significantly reduce the amount of reducing agent used while significantly reducing the NOx removal rate and the generation of hydrogen sulfide ($H_2S$) by performing individual and sequential chemical reactions.

Next, another example of the method of removing nitrogen oxide from exhaust gas using the apparatus for removing nitrogen oxide from exhaust gas according to the second exemplary embodiment of the present invention will be described.

In this example, sodium thiosulfate ($Na_2S_2O_3$) and sodium sulfite ($Na_2SO_3$) mixed in a one-to-one ratio as the reducing agent are sprayed in the first channel 120, and NaOH as the neutralizing agent is sprayed in the second channel 130. In addition, since the entire device is the same as that of the above-described second exemplary embodiment, a description of the device will be omitted.

The reducing agent sprayed from the first channel 120 is sodium thiosulfate ($Na_2S_2O_3$) and sodium sulfite ($Na_2SO_3$) mixed one-to-one and reacts with nitrogen dioxide of exhaust gas according to the following Chemical Formula.

$$2NO_2 + 4Na_2SO_3 \rightarrow 4Na_2SO_4 + N_2 \quad \text{(Chemical Formula 7)}$$

$$2NO_2 + Na_2S_2O_3 + H_2O \rightarrow Na_2S_2O_4 + 2HNO_2 + S \quad \text{(Chemical Formula 8)}$$

Here, $NO_2$ is removed while $Na_2S_2O_4$ is generated, and $HNO_2$ is generated as a by-product.

The exhaust gas containing the by-product $HNO_2$ moves to the second channel 130 and is removed by reacting with NaOH as shown in the following Chemical Formula 7.

$$HNO_2 + NaOH \rightarrow NaNO_2 + H_2O \quad \text{(Chemical Formula 9)}$$

Meanwhile, as described in the second exemplary embodiment, the control unit may receive the concentration of NOx from the gas analyzer 150 and calculates the NOx removal rate and control the input timing and input amount of the reducing agent and the neutralizing agent according to the preset reference value of NOx removal rate or the preset reference value of $H_2S$ generation concentration.

In this case, the NOx removal rate is calculated from the ORP measurement value received from the ORP sensor 124, and the $H_2S$ generation concentration may be measured from the pH measurement value received from the pH sensor 134.

By using the method, it is possible to significantly reduce the amount of reducing agent used while significantly reducing the NOx removal rate and the generation of hydrogen sulfide ($H_2S$) by performing individual and sequential chemical reactions.

EXPERIMENTAL EXAMPLE

The table below is a table of experimental results by changing a type of reducing agent and materials input to exhaust gas to measure the amount of reducing agent suitable for the exhaust gas containing NOx.

| NO | Processed gas | Reducing agent | Average NOx removal rate (%) | Number of channels | Theoretical usage of reducing agent (g/min) | Reducing agent usage (g/min) |
|---|---|---|---|---|---|---|
| 1 | NOx | $Na_2S$ | 67.0 | 1 | 0.23 | 0.58 |
| 2 | NOx | $Na_2S$ | 77.9 | 1 | 0.29 | 1.46 |
| 3 | NOx, HCl | $Na_2S$ | 81.0 | 1 | 0.30 | 1.88 |
| 4 | Nox, $SO_2$ | $Na_2S$ | 82.9 | 1 | 0.37 | 2.17 |
| 5 | NOx, HCl, $SO_2$ | $Na_2S$ | 83.0 | 1 | 0.34 | 2.60 |

-continued

| | | | | | | |
|---|---|---|---|---|---|---|
| 6 | NOx | Na₂S | 84.1 | 2 | 0.38 | 0.53 |
| 7 | NOx | Na₂S | 82.6 | 2 | 0.29 | 0.49 |
| 8 | NOx | Na₂SO₃ | 77.9 | 1 | 1.54 | 80.9 |
| 9 | NOx | Na₂S₂O₃ | 69.0 | 1 | 1.34 | 57.3 |
| 10 | NOx | Na₂SO₃ + Na₂S₂O₃ | 82.0 | 1 | 1.45 | 7.90 |
| 11 | NOx, HCl, SO₂ | Na₂SO₃ + Na₂S₂O₃ | 81.0 | 2 | 1.42 | 7.80 |

| NO | Usage to theoretical usage (times) | Whether to use NaOH | Theoretical usage of NaOH *g/min | NaOH usage (g/min) | Usage of theoretical usage of NaOH (times) | Amount of H₂S generated (ppm) |
|---|---|---|---|---|---|---|
| 1 | 2.52 | X | 0 | 0 | 0 | 23.7 |
| 2 | 5.11 | ○ | 0.26 | 0.12 | 0.47 | 4.0 |
| 3 | 6.20 | ○ | 0.60 | 0.30 | 0.60 | 1.0 |
| 4 | 5.84 | ○ | 0.79 | 0.56 | 0.71 | 1.8 |
| 5 | 7.25 | ○ | 0.96 | 1.04 | 1.09 | 1.2 |
| 6 | 1.40 | X | 0 | 0 | 0 | 12.2 |
| 7 | 1.67 | ○ | 0.28 | 0.15 | 0.58 | 1.3 |
| 8 | 52.6 | X | 0 | 0 | 0 | 0 |
| 9 | 42.7 | X | 0 | 0 | 0 | 0 |
| 10 | 5.45 | X | 0 | 0 | 0 | 0 |
| 11 | 5.50 | ○ | 0.92 | 0.98 | 1.06 | 0 |

All the experimental conditions of the above experiments were different only for the type of reducing agent, whether to use sodium hydroxide (NaOH), NOx and other components contained in the exhaust gas, and the injection speed and concentration of the exhaust gas, an operation time, etc., were experimented under the same conditions. The set NOx removal rate (reference value) is 80%, and the generated H₂S concentration (reference value) is 0 ppm.

Experiment 1

Experiment 1 showed that exhaust gas containing NOx was introduced into the first exemplary embodiment (hereinafter, a chamber with a single channel), by using Na₂S as the reducing agent, the average NOx removal rate was 67.0%, and the concentration of H₂S generated was 23.7 ppm. In this case, the actual usage of Na₂S was 0.58 (g/min), which was 2.52 times the theoretical usage 0.23 (g/min). Experiment 1 showed that the average NOx removal rate was 67%, which did not reach the set NOx removal rate (80%), and the concentration (23.7 ppm) of H₂S was very high.

Experiment 2

Experiment 2 showed that NaOH with Na was used together with Na₂S to suppress the H₂S generated in Experiment 1, and thus, the average NOx removal rate was 77.9% and the concentration of H₂S generated was 4.0 ppm. In this case, the actual usage of Na₂S was 1.46 (g/min), which was 5.11 times the theoretical usage 0.29 (g/min), and the actual usage of NaOH was 0.12 (g/min), which was 0.47 times the theoretical usage 0.26 (g/min). In Experiment 2, the concentration (4.0 ppm) of H₂S was lowered as the average NOx removal rate was increased to 77.9% which was close to 80%, compared to Experiment 1, but the usage of Na₂S, which is the reducing agent, was increased more than twice. The average NOx removal rate and the concentration of H₂S was still less than the reference value, and only the usage of the reducing agent was increased.

Experiment 3

Experiment 3 showed that exhaust gas containing NOx and HCl was introduced into a chamber with a single channel, and Na₂S and NaOH were used together as the reducing agent, and thus, the average NOx removal rate was 81.0%, and the concentration of H₂S generated was 1.0 ppm. In this case, the actual usage of Na₂S was 1.88 (g/min), which was 6.2 times the theoretical usage 0.30 (g/min), and the actual usage of NaOH was 0.30 (g/min), which was times the theoretical usage 0.50 (g/min). Experiment 3 assumes that HCl is contained in the exhaust gas of the semiconductor process. Compared to Experiment 2, the average NOx removal rate (81.0%) had a lower concentration (1.0 ppm) of H₂S, but the concentration of H₂S was still higher than the reference value, and the amount of Na₂S used, which is the reducing agent, was increased.

Experiment 4

Experiment 4 showed that exhaust gas containing NOx and SO₂ was introduced into a chamber with a single channel, and Na₂S and NaOH were used together as the reducing agent, and thus, the average NOx removal rate was 82.9%, and the concentration of H₂S generated was 1.8 ppm. In this case, the actual usage of Na₂S was 2.17 (g/min), which was 5.84 times the theoretical usage 0.37 (g/min), and the actual usage of NaOH was 0.56 (g/min), which was 0.71 times the theoretical usage 0.56 (g/min). Experiment 4 assumes that SO₂ is contained in the exhaust gas of the semiconductor process. Compared to Experiment 3, the amount of Na₂S used was relatively decreased while the average NOx removal rate (82.9%) was increased, but the concentration (1.8 ppm) of H₂S was still higher than the reference value.

Experiment 5

Experiment 5 showed that exhaust gas containing NOx, HCl, and SO₂ was introduced into a chamber with a single channel, and Na₂S and NaOH were used together as the reducing agent, and thus, the average NOx removal rate was 83.0%, and the concentration of H₂S was 1.2 ppm. In this case, the actual usage of Na₂S was 2.50 (g/min), which was 7.25 times the theoretical usage 0.34 (g/min), and the actual usage of NaOH was 1.04 (g/min), which was 1.09 times the theoretical usage 0.95 (g/min). Experiment 5 assumes that HCl and $SO_2$ are contained in the exhaust gas of the semiconductor process. Compared to Experiment 4, the average NOx removal rate (83.0%) was increased, but the concentration (1.2 ppm) of $H_2S$ used was still higher than the reference value, and the amount of $Na_2S$ used was increased to 7.25 times.

Experiment 6

In Experiment 6, exhaust gas containing NOx was introduced into the second exemplary embodiment (hereinafter, a chamber formed with two channels), and $Na_2S$, which is a reducing agent, was used only in the first channel. In this case, the average NOx removal rate was 84.1%, the concentration of $H_2S$ was 12.2 ppm, and the actual usage of $Na_2S$ was 0.53 (g/min), which was 1.40 times of the theoretical usage 0.38 (g/min). In Experiment 6, the usage to the theoretical usage of reducing agent was lowered compared to Experiment 1, and the average NOx removal rate was increased to a suitable level of 84.1%, but the concentration of $H_2S$ was still maintained at a high level of 12.2 ppm.

Experiment 7

In Experiment 7, exhaust gas containing NOx was introduced into a chamber formed with two channels, $Na_2S$, which is a reducing agent, was used in a first channel, and NaOH, which is a neutralizing agent, was used in a second channel. In this case, the average NOx removal rate was 82.6%, the concentration of $H_2S$ was 1.3 ppm, the actual usage of $Na_2S$ was 0.49 (g/min), which was 1.67 times the theoretical usage 0.29 (g/min), and the actual usage of NaOH was 0.15 (g/min), which was 0.58 times the theoretical usage 0.26 (g/min). In Experiment 7, compared to Experiment 2 in which $Na_2S$ and NaOH were used together in a single channel, the average NOx removal rate was increased to a suitable level of 82.6% while the usage to the theoretical usage of reducing agent was decreased to a very low level, and the concentration of $H_2S$ was decreased to a very low level of 1.3 ppm.

That is, it was confirmed that the use of $Na_2S$ and NaOH by separating each of the two channels reduced the concentration of $H_2S$ while significantly reducing the amount of reducing agent used.

Experiment 8

Experiment 8 showed that exhaust gas containing NOx was introduced into a chamber with a single channel, by using $Na_2S_2O_3$ as a reducing agent, the average NOx removal rate was 77.9%, and the concentration of $H_2S$ generated was 0 ppm. In this case, the actual usage of $Na_2S_2O_3$ was 80.9 (g/min), which was 80.9 times the theoretical usage 1.54 (g/min). Experiment 8 is the most ideal form because the concentration of $H_2S$ is 0 ppm, compared to Experiments 1 to 7, and $H_2S$ was not generated, but it was confirmed that there is a problem in that the amount of reducing agent used is 80.9 times higher than the theoretical usage.

Experiment 9

Experiment 9 showed that exhaust gas containing NOx was introduced into a chamber with a single channel, by using $Na_2S_2O_3$ as a reducing agent, the average NOx removal rate was 69.0%, and the concentration of $H_2S$ generated was 0 ppm. In this case, the actual usage of $Na_2S_2O_3$ was 57.3 (g/min), which was 42.7 times the theoretical usage 1.34 (g/min). In Experiment 9, the concentration of $H_2S$ was 0 ppm, compared to Experiments 1 to 7, so $H_2S$ was not generated, and compared to Experiment 8, the amount of reducing agent used was also reduced, but it was confirmed that the amount of reducing agent used was still 42.7 times higher than the theoretical usage.

Mixing Ratio Experiment

Based on the experimental results of Experiment 8 and Experiment 9, it was confirmed that $H_2S$ was not generated in sodium thiosulfate ($Na_2S_2O_3$) and sodium sulfite ($Na_2SO_3$). Accordingly, the sodium thiosulfate ($Na_2S_2O_3$) and sodium sulfite ($Na_2SO_3$) were mixed and used as a reducing agent, and the following mixing ratio experiment was conducted to find the optimal mixing ratio that may minimize the amount of reducing agent used. As experimental conditions, a flow rate of exhaust gas was set to 1 CMM ($m^3$/min), a concentration of nitrogen monoxide (NO) was set to 200 ppm, and an average NOx removal rate was 90% for an average operating time of 1 hour.

Figure 5:
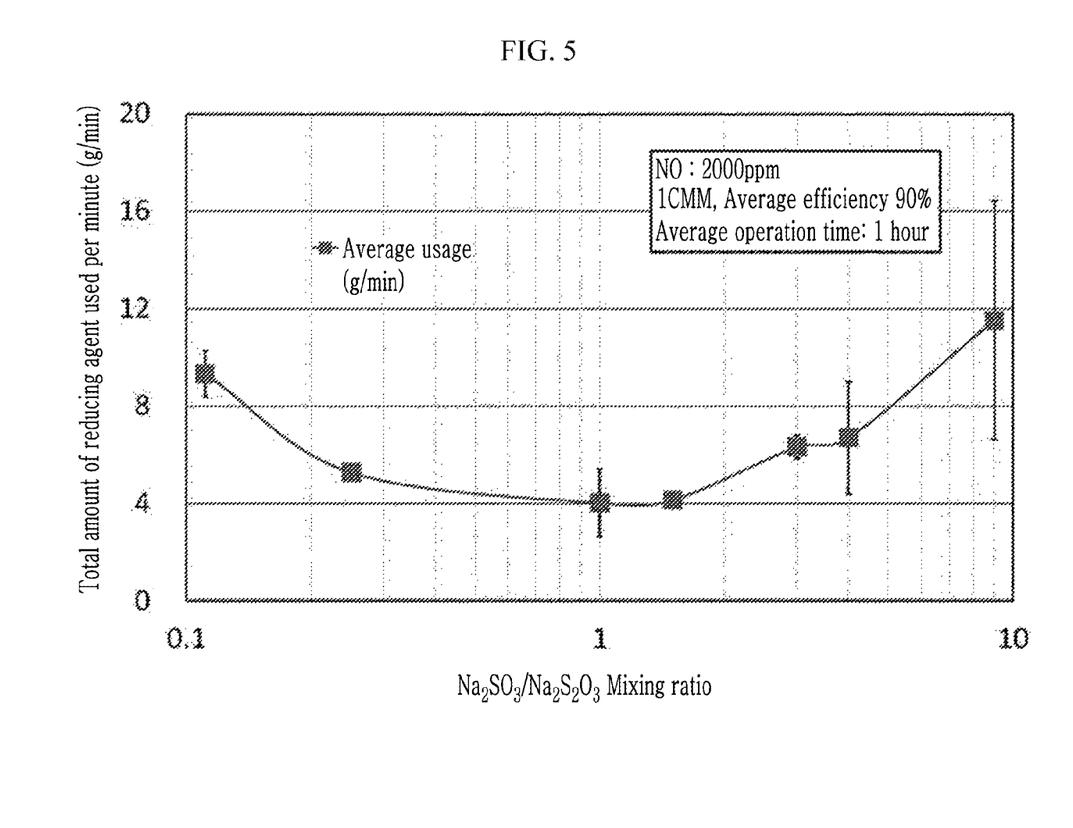
FIG. 5 is a graph illustrating a relationship between a total amount of reducing agent used per minute and a mixing ratio of a reducing agent.

FIG. 5 is a graph illustrating a relationship between a total amount of reducing agent used per minute and a mixing ratio of a reducing agent. Referring to FIG. 5, the total amount of reducing agent used per minute (g/min) is approximately shown as a "U"-shaped graph when viewed as a whole, and it was that, when the mixing ratio is 1:1, the amount of reducing agent used is lowest, and it was confirmed that the mixing ratio of 1:1 was the optimal mixing ratio to minimize the amount of reducing agent used.

Experiment 10

Experiment 10 showed that exhaust gas containing NOx was introduced into a chamber with a single channel, by using $Na_2SO_3+Na_2S_2O_3$ mixed one-to-one as a reducing agent, the average NOx removal rate was 82.0%, and the concentration of $H_2S$ generated was 0 ppm. In this case, the actual usage of $Na_2SO_3+Na_2S_2O_3$ mixed in a one-to-one ratio was 7.90 (g/min), which was 5.45 times the theoretical usage 1.45 (g/min). In Experiment 10, the concentration of $H_2S$ was 0 ppm, compared to Experiments 1 to 7, and $H_2S$ was not generated, and it was confirmed that the amount of reducing agent used was also significantly reduced to a level of ⅛ to 1/10 compared to Experiments 8 and 9.

As such, in a chamber with a single channel (the first exemplary embodiment), by using sodium thiosulfate ($Na_2S_2O_3$) and sodium sulfite ($Na_2SO_3$) mixed one-to-one as a reducing agent, the NOx removal rate may be maintained to be equal to or higher than the reference value, $H_2S$ may not be generated, and the amount of reducing agent used may be minimized.

Experiment 11

In Experiment 11, exhaust gas containing NOx was introduced into a chamber formed with two channels, $Na_2SO_3+Na_2S_2O_3$ mixed in a one-to-one ratio, which is a reducing agent, was used in a first channel, and NaOH, which is a neutralizing agent, was used in a second channel. Experiment 11 assumes that HCl and $SO_2$ are contained in the exhaust gas of the semiconductor process as in Experiment 5, and it is intended to confirm the reduction in the concentration of $H_2S$ and the reduction in the amount of reduction agent used by using NaOH in the second channel confirmed through Experiment 7.

The results of Experiment 11 showed that the average NOx removal rate of was 81.0% and the concentration of $H_2S$ was 0 ppm. In addition, the actual usage of $Na_2SO_3$+$Na_2S_2O_3$ mixed in a one-to-one ratio was 7.80 (g/min), which was 5.5 times the theoretical usage 1.42 (g/min), and the actual usage of NaOH, which is the neutralizing agent, was 0.98 (g/min), which was 1.06 times the technical usage 0.92 (g/min). As a result, even under the same conditions as in the actual semiconductor process environment, $H_2S$ was not generated while significantly lowering the amount of reducing agent used.

As described above, in the chamber formed with two channels (second exemplary embodiment), when $Na_2SO_3$+$Na_2S_2O_3$ mixed in a one-to-one ratio is used in the first channel, and NaOH is used in the second channel, the NOx removal rate may satisfy the set value, $H_2S$ may not be generated, and the amount of reducing agent used may be significantly reduced.

The scope of the present invention is not limited to the abovementioned exemplary embodiment but may be implemented in various forms that fall within the claims. The present invention may be variously modified by those skilled in the art to which the present invention pertains without departing from the scope of the present invention as defined by the claims. In addition, these modifications are to fall within the scope of the following claims.

| ※Description of Reference Numerals Indicating Primary Elements in the Drawings※ |
|---|
| 10: Ozone generator |
| 20: Chamber |
| 21: Storage tank |
| 22: Water tank |
| 23: ORP sensor |
| 24: pH sensor |
| 30: Nozzle |
| 40: Electric dust collecting unit |
| 41: Dust collecting chamber |
| 42: Discharge unit |
| 43: Dust collecting unit |
| 50: Gas analyzer |
| 110: Ozone generator |
| 120: First channel |
| 121: First storage tank |
| 122: First nozzle |
| 123: First water tank |
| 124: ORP sensor |
| 130: Second channel |
| 131: Second storage tank |
| 132: Second nozzle |
| 133: Second water tank |
| 134: pH sensor |
| 140: Electric dust collecting unit |
| 141: Dust collecting unit chamber |
| 142: Discharge unit |
| 143: Dust collecting unit |
| 150: Gas analyzer |

The invention claimed is:

1. An apparatus for removing nitrogen oxide from exhaust gas, comprising:
a chamber through which exhaust gas is introduced and discharged;
a nozzle injecting a solution into the chamber, the solution reacting with the exhaust gas introduced into the chamber;
an electric dust collecting unit installed at a rear end of the chamber to be supplied with the exhaust gas processed in the chamber and including a discharge unit and a dust collecting unit;
a gas analyzer measuring a concentration of NOx and $H_2S$ of the exhaust gas discharged from the electric dust collecting unit; and
a storage tank located under the chamber to store the solution,
wherein the solution is circulated between the nozzle and the storage tank through a pump.

2. The apparatus of claim 1, wherein
the solution includes the reducing agent that reacts with the NOx of the exhaust gas, and
the apparatus further includes: a water tank having a reducing agent stored therein and supplying the reducing agent to the storage tank;
a pH sensor measuring the pH of the reducing agent stored in the storage tank;
an ORP sensor measuring an ORP of the reducing agent stored in the storage tank; and
a control unit calculating an NOx removal rate based on the measured value of the ORP sensor according to the concentration of NOx of the gas analyzer, outputting the concentration of $H_2S$ based on the measured value of the pH sensor, and controlling input timing and an input amount of the reducing agent stored in the water tank according to a set reference value of the NOx removal rate or a set reference value of $H_2S$ generation concentration.

3. The apparatus of claim 2, wherein:
when the calculated NOx removal rate is smaller than the set NOx removal rate, the control unit controls to supply the reducing agent of the water tank to the first storage tank to be greater than or equal to the set NOx removal rate.

4. The apparatus of claim 2, wherein:
when the measured concentration of $H_2S$ becomes larger than the set concentration of $H_2S$, the control unit controls to supply the reducing agent of the water tank to the chamber to be less than or equal to the set concentration of $H_2S$.

5. The apparatus of claim 2, wherein:
the dust collecting unit includes a water film formed by the reducing agent.

6. The apparatus of claim 2, wherein:
the reducing agent is sodium thiosulfate ($Na_2S_2O_3$) and sodium sulfite ($Na_2SO_3$) mixed in a one-to-one mass ratio.

7. The apparatus of claim 1, wherein:
the solution includes a reducing agent and a neutralizing agent, and
the chamber includes:
a first channel through which the reducing agent is injected into the chamber; and
a second channel installed at a rear end of the first channel and through which the exhaust gas passing through the first channel is introduced and the neutralizing agent is injected into the chamber.

8. The apparatus of claim 7, wherein:
the chamber is divided into the first channel and the second channel located on a side surface of the first channel by a partition wall, and the neutralizing agent is sprayed so as not to be mixed with the reducing agent.

9. The apparatus of claim 7, further comprising:
a first storage tank located under the first channel and storing the reducing agent;
a first water tank installed to supply the reducing agent to the first storage tank;
an ORP sensor measuring an ORP of the reducing agent stored in the storage tank;
a second storage tank located under the second channel and storing the neutralizing agent;
a second water tank installed to supply the neutralizing agent to the second storage tank;
a pH sensor measuring the pH of the neutralizing agent stored in the second storage tank; and,
a control unit calculating an NOx removal rate based on the measured value of the ORP sensor according to the concentration of NOx of the gas analyzer, outputting the concentration of $H_2S$ based on the measured value of the pH sensor, and controlling input timing and an input amount of the reducing agent and the neutralizing agent according to a set reference value of the NOx removal rate or a set reference value of $H_2S$ generation concentration.

10. The apparatus of claim 9, wherein:
the nozzle includes a first nozzle injecting the reducing agent into the first channel and a second nozzle injecting the neutralizing agent into the second channel, and
the reducing agent is circulated between the first nozzle and the first storage tank, and the neutralizing agent is circulated between the second nozzle and the second storage tank.

11. The apparatus of claim 9, wherein:
when the calculated NOx removal rate is smaller than the set NOx removal rate, the control unit controls to supply the reducing agent of the water tank to the first channel to be greater than or equal to the set NOx removal rate.

12. The apparatus of claim 9, wherein:
when the measured concentration of $H_2S$ becomes larger than the set concentration of $H_2S$, the control unit controls to supply the neutralizing agent of the second water tank to the second channel to be less than or equal to the set concentration of $H_2S$.

13. The apparatus of claim 7, wherein:
the dust collecting unit includes a water film formed by the neutralizing agent.

14. The apparatus of claim 1, further comprising:
an ozone generator installed at a front end of the chamber to inject ozone into the exhaust gas before being injected into the chamber.

15. A method of removing nitrogen oxide from exhaust gas, comprising:
introducing the exhaust gas into a chamber;
removing the nitrogen oxide by spraying a solution into the chamber; and
collecting an acidic material particle in an electric dust collecting unit and removing the acidic material particle from the exhaust gas,
wherein in the removing of the nitrogen oxide,
a reducing agent made of sodium thiosulfate ($Na_2S_2O_3$) and sodium sulfite ($Na_2SO_3$) mixed in a one-to-one mass ratio is sprayed into the chamber to react the reducing agent with the nitrogen dioxide contained in the exhaust gas, and
the reducing agent controls input timing and an input amount according to the set reference value of NOx removal rate or a set reference value of $H_2S$ generation concentration.

16. The method of claim 15, wherein:
the chamber includes a first channel and a second channel connected sequentially, and
in the removing of the nitrogen oxide,
the reducing agent is sprayed into the exhaust gas introduced into the first channel;
a neutralizing agent is sprayed into the exhaust gas introduced into the second channel of the chamber through the first channel, and
the reducing agent controls the input timing and input amount according to the set reference value of NOx removal rate, and the neutralizing agent controls the input timing and input amount according to the set reference value of $H_2S$ generation concentration.

17. The method of claim 16, wherein;
the neutralizing agent is NaOH.

18. The method of claim 15, further comprising:
injecting ozone by reacting nitrogen monoxide with ozone in the exhaust gas react to generate nitrogen dioxide before the exhaust gas is introduced into the chamber.

* * * * *